United States Patent
Brogårdh et al.

(10) Patent No.: US 6,230,079 B1
(45) Date of Patent: May 8, 2001

(54) METHOD FOR CONTROL OF AN INDUSTRIAL ROBOT

(75) Inventors: Torgny Brogårdh, Våsterås; Håkan Dahlquist, Hässelby; Staffan Elfving; Tord Henriksson, both of Västerås, all of (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/077,733
(22) PCT Filed: Jan. 22, 1997
(86) PCT No.: PCT/SE97/00094
 § 371 Date: Jun. 9, 1998
 § 102(e) Date: Jun. 9, 1998
(87) PCT Pub. No.: WO97/27978
 PCT Pub. Date: Aug. 7, 1997

(30) Foreign Application Priority Data

Jan. 31, 1996 (SE) .................................. 9600344

(51) Int. Cl.[7] .................................. G05B 15/00
(52) U.S. Cl. ........................... 700/260; 700/262
(58) Field of Search ................. 700/33, 79, 245, 700/250, 256, 260, 261, 262; 318/568.19, 568.24, 568.22

(56) References Cited

U.S. PATENT DOCUMENTS

| | | | |
|---|---|---|---|
| 4,245,316 | 1/1981 | Koikawa et al. | 700/175 |
| 4,249,243 | 2/1981 | Yoshida et al. | 700/175 |
| 4,351,029 | * 9/1982 | Maxey et al. | 702/34 |
| 4,608,644 | 8/1986 | Kiya | 700/175 |
| 4,819,184 | * 4/1989 | Jonsson et al. | 700/261 |
| 5,083,284 | 1/1992 | Kato | 702/34 |
| 5,101,472 | * 3/1992 | Repperger | 700/261 |
| 5,130,632 | * 7/1992 | Ezawa et al. | 318/568.11 |
| 5,515,266 | * 5/1996 | Meyer | 700/79 |
| 5,732,194 | * 3/1998 | Jones | 700/245 |

FOREIGN PATENT DOCUMENTS

361071345A * 4/1986 (JP) .

* cited by examiner

Primary Examiner—William Grant
Assistant Examiner—Zoila Cabrera
(74) Attorney, Agent, or Firm—Connolly Bove Lodge & Hutz LLP

(57) ABSTRACT

A method for control of an industrial robot, which has a plurality of movement axes with a position sensor for each of said axes which is adapted to deliver an output signal which defines the current position of the axis, and a control system for control of the axes of the robot. Continuously during operation of the robot for at least one mechanically critical point (i) of the robot, the relevant load ($\tau_i$) during a predetermined period of time ($\Delta t$) is calculated on the basis of the output signals ($\phi_1, \phi_2 \ldots \phi_6$) from the position sensors and a mathematical model of the robot. Further, the rate of fatigue $$\left(\frac{\Delta D_i}{\Delta t}\right)$$

of the point is calculated on the basis of the calculated load and with knowledge of the fatigue strength ($N_{ij}$) of the material at the critical point. The performance ($\phi_{axis,max}$, $\tau_{axis,max}$) of the robot is adjusted in dependence on the rate of fatigue and the desired service life ($t_{life}$) of the robot.

14 Claims, 4 Drawing Sheets

METHOD FOR CONTROL OF AN INDUSTRIAL ROBOT

TECHNICAL FIELD

The invention relates to a method for control of an industrial robot, which has a plurality of movement axes with a position sensor for each one of the axes which is adapted to deliver a signal which defines the current position of the robot, and a control system for controlling the axes of the robot, the output signals from the position sensors being supplied to the control system.

BACKGROUND ART

The service life of an industrial robot is determined by how its mechanical structure and its components are loaded during the movements carried out by the robot during its service life. The mechanics of robots of today is dimensioned such that the robot is to be able to carry out the severest movement pattern conceivable during the whole of its specified service life. Only a small number of robots are run with such movement programs, which are unfavorable for the mechanical structure, and therefore almost all robots of today are mechanically oversized in relation to their specified service life.

A typical industrial robot comprises a number of robot arms, which are rotatable in relation to each other, and a hand provided with a tool attachment. The robot hand is rotatable in two or three degrees of freedom relative to the arm supporting the hand. The robot is provided with a control system which controls the position and the orientation of the robot hand. For each one of the movement axes of the robot, servo equipment comprising a driving motor and a position sensor is provided. The position sensor delivers a signal which is a measure of the angle of rotation of the axis in question. The servo system of each axis is supplied with a reference value for the angle of rotation of the axis, and the driving motor of the axis brings the robot to move in the axis in question until the axis position indicated by the position sensor of the axis coincides with the reference value supplied to the servo system.

To prevent the loads on the mechanical components of the robot, for example bearings, shafts, stays, motor housing and arm attachments, from becoming too high, limits to the maximum permissible torques and speed for each one of the axes of the robots are set. These limits are set prior to delivery of the robot and limit the performance of the robot, that is, the maximum speeds and maximum torques of the axes, during the whole service life of the robot. The limits to the maximum permissible axis torque and axis speed are calculated based on the guaranteed service life of the robot and fatigue diagrams for the mechanical structure. The calculation starts from a worst conceivable case with abnormal movement patterns and with an abnormal number of cycles per unit of time.

The mechanical load on a mechanical component at a certain time depends on several different factors, for example the speed, acceleration, configuration, and load of the robot. This means that if the robot has an advantageous configuration or a small load, the limits set to the maximum permissible axis torque and axis speed may be exceeded without the load of the component becoming too high.

SUMMARY OF THE INVENTION

The object of the invention is to increase the degree of utilization of the robot so that its mechanics are utilized to their maximum.

The current load at at least one mechanically critical point is calculated continuously on the basis of the output signals from the position sensors and a mathematical model for the robot. At regular intervals, a utilization factor for the critical point is calculated based on the load spectrum of the point during a predetermined period of observation. On the basis of the utilization factor and the service life of the robot, the maximally permissible load at the critical point is calculated. The service life may either be predetermined or optional. The maximum permissible load is calculated continuously during the robot cycles in question for each one of the critical points. The current load and the maximum permissible load are compared continuously and if the current load exceeds the maximum permissible load, axis speeds and axis torques are limited such that the load at the critical point is reduced.

By taking into account the magnitude of the loads to which certain mechanical structures are subjected, axis speeds and axis torques may be increased such that their mechanics are utilized to their maximum. In this way, a robot which carries out movement patterns which are favorable to the mechanics will have a higher performance than a robot which is run with unfavourable movement patterns. Likewise, a robot which handles small tool and arm loads will have a higher performance.

In one embodiment of the invention, the maximum permissible load is calculated in view of the desired service life of the robot. The maximum permissible load is then calculated on the basis of the whole prehistory of the robot. At any time, the user may be informed by the control system of the time remaining of the service life of the robot. If the user is not satisfied with the remaining service life, he may change the value of the remaining service life, after which the control system determines a new maximum permissible load on the basis of the new value of the service life. In this way, the user may himself choose between higher performance and shorter service life or lower performance and longer service life of his robot.

In another embodiment, a fixed service life is determined on installation of the robot. The control system then calculates during the observation periods the maximum permissible loads in relation to the fixed service life, whereby axis speeds and axis torques are adjusted such that the maximum permissible loads are not exceeded. In this case, no data about the prehistory of the robot need be stored, which is an advantage when replacing the control cabinet or in case of memory failures.

DESCRIPTION OF THE PREFERRED EMBODIMENTS

Figure 1:
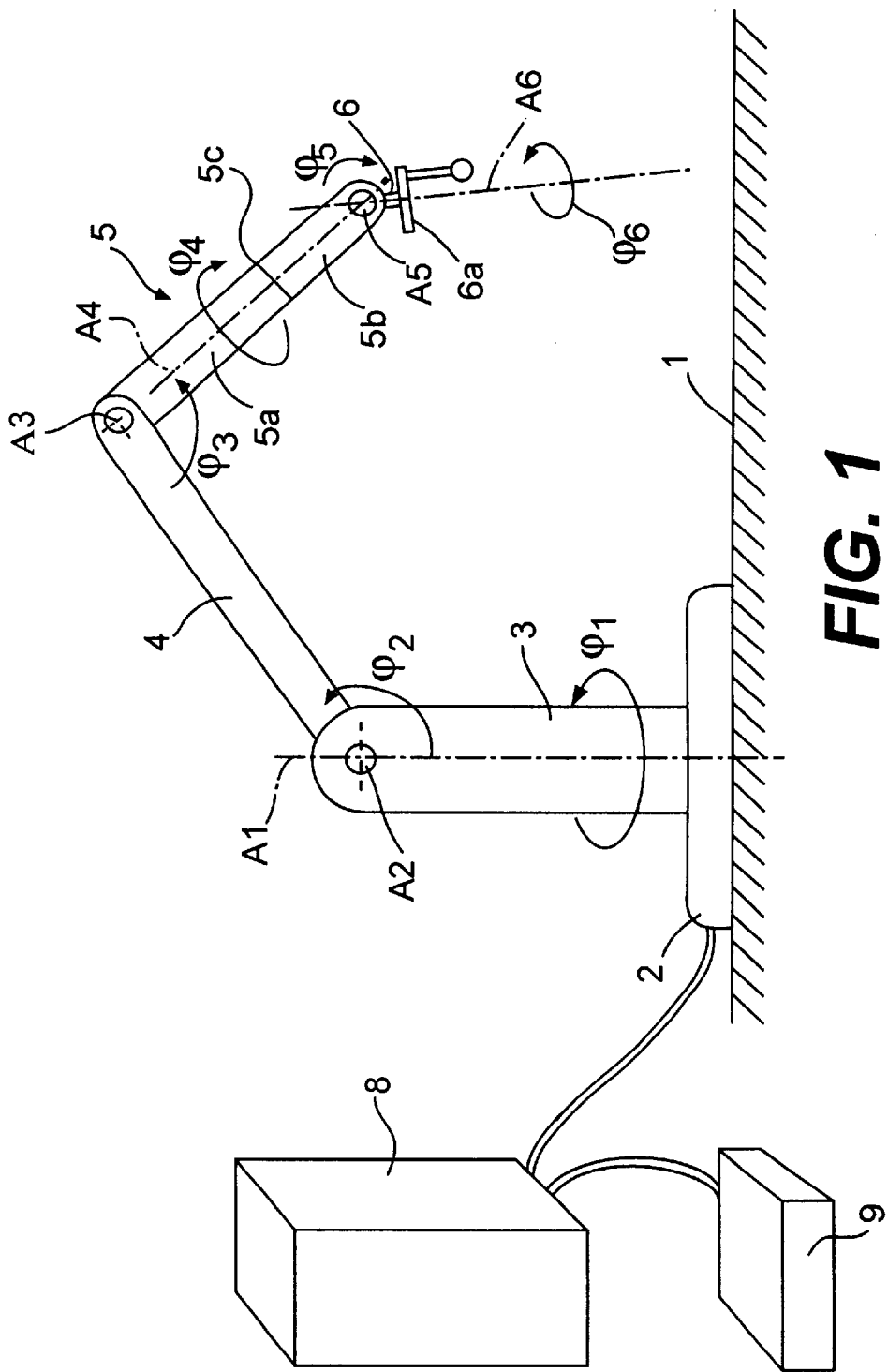
FIG. 1 shows an example of a known industrial robot.

FIG. 1 shows an example of a known industrial robot. The robot foot 2 is fixedly mounted on a base 1. The robot has a base stand 3 which is rotatable in relation to the foot 2 around a vertical axis A1. At the upper end of the base stand, a first robot arm 4 is journalled and rotatable in relation to the base stand around a second axis A2. At the outer end of the arm, a second arm 5 is journalled and rotatable in relation to the first arm around an axis A3. The robot arm 5 comprises two parts 5a and 5b, the outer part 5b being rotatable in relation to the inner part 5a around an axis of rotation A4 coinciding with the longitudinal axis of the arm. At its outer end the arm 5 supports a so-called robot hand 6, which is rotatable around an axis of rotation A5 perpendicular to the longitudinal axis of the arm. The robot hand comprises a tool attachment 6a. The outer part of the robot hand and hence the tool attachment 6a are rotatable in relation to the inner part of the robot hand around an axis of rotation A6. The angles of rotation in the six axes of rotation A1 . . . A6 are designated $\phi_1-\phi_6$ in the figure.

For each one of the movement axes of the robot, there is a position sensor which delivers a signal which is a measure of the angle of rotation of the axis in question. The output signals from the position sensors are supplied to the control system of the robot. The control system is arranged in a separate control cabinet 8 and comprises, in a known manner, computer equipment with the necessary memories for programs and other data, drives for the driving motors of the different robot axes and the necessary supply equipment.

The control cabinet is connected to a programming unit 9 for programming and other operation of the robot. The control unit comprises a mathematical model of the robot which is used for calculations of various kinds.

The mechanical strength of a robot is often determined by a small number of critical load points. For these load points, it is important that the force or torque amplitudes arisen during the robot movements must not exceed the level which provides fatigue breakdown during the service life of the robot.

With the aid of a mathematical model of the robot dynamics and the output signals from the position sensors, the load at a critical point may be calculated. The load may be torque, force, stress, deflection, or rotation. The load is derived from such dynamic effects as coupled mass inertia, centrifugal force and gravitation. In this embodiment, the load is calculated as a bending moment $\tau$:

$$\tau = M_i(\phi) \cdot \ddot{\phi} + V_i(\phi) \cdot (\dot{\phi})^2 + G_i(\phi) \tag{1}$$

$\phi = \phi_1, \phi_2 \ldots \phi_6$ position of the robot
$\dot{\phi} = \dot{\phi}_1, \dot{\phi}_2 \ldots \dot{\phi}_6$ = speed of the robot
$\ddot{\phi} = \ddot{\phi}_1, \ddot{\phi}_2 \ldots \ddot{\phi}_6$ = acceleration of the robot.

$M_i(\phi)$ describes the connection between the accelerations of the robot arms and the bending moment at the critical point. $V_i(\phi)$ describes the connection between the centrifugal force of all parts of the robot and the bending moment at the critical point. $G_i(\phi)$ describes the effect of the gravitation on the bending moment.

Figure 2A:
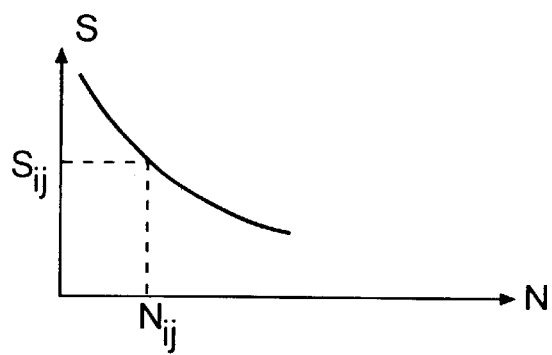
FIG. 2a shows an example of a fatigue diagram.
Figure 2B:
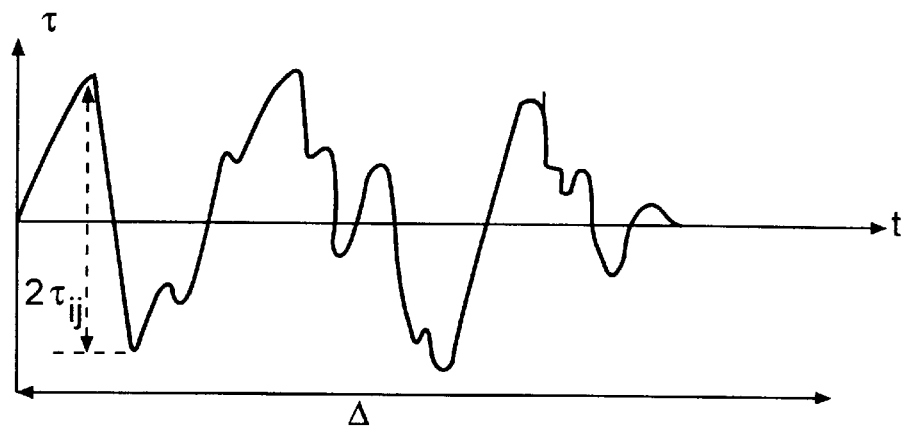
FIG. 2b shows an example of a torque-time function.
Figure 2C:
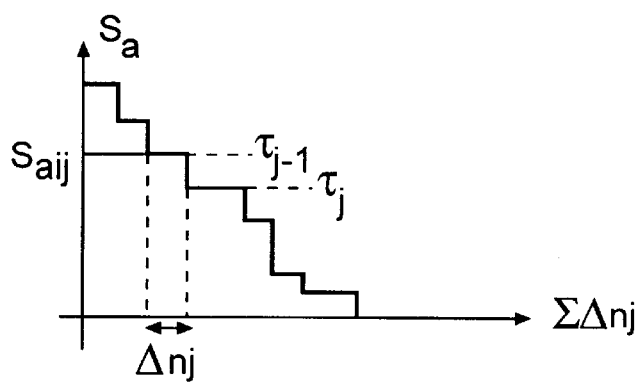
FIG. 2c shows an example of a load spectrum

The strength of a material at varying loads is dependent on the amplitude of the load changes and their number during the service life of the material. From the fatigue diagram of the material, the number of stress changes N with a certain amplitude S that the material endures during its service life may be read. FIG. 2a shows an example of a fatigue diagram. FIG. 2b shows an example of how a bending moment $\tau$ may vary during an observation period $\Delta t$ at a critical point in a so-called torque-time function. From the torque-time function, the amplitudes $\tau_{ij}$ for the torque changes may be read. FIG. 2c shows an example of a load spectrum for one critical point based on measurements during one observation period. A load spectrum shows the number of torque changes $n_i$ occurring within an amplitude interval, whose mean amplitude is $S_{aij}$.

Figure 3:
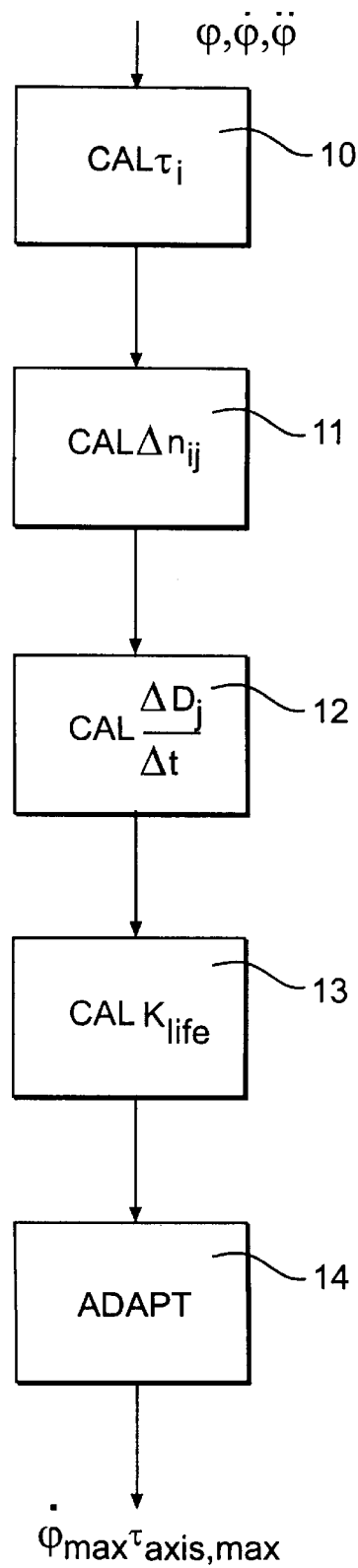
FIG. 3 shows a flow diagram for a first embodiment according to the invention.

FIG. 3 shows how the calculation of maximum load, that is, maximum values for axis speeds $\dot{\phi}_{max}$ and axis torque $\tau_{axis,max}$ may be carried out according to one embodiment of the invention. The robot in this embodiment has a number (i) of critical points. The critical points may be weak points in the robot structure, for example bearings, shafts, links, gearboxes, or other life-limiting components. The bending moments $\tau_i$ are calculated for each one of the points starting from the output signals $\phi_1, \phi_2 \ldots \phi_6$ from the position sensor of the robot according to equation 1, block 10. The calculation of the bending moments takes place continuously, for example every 24th $\mu s$. When running the robot, one torque-time function for each point is then obtained.

To obtain the load spectrum for a point, all the torque changes must be detected and their amplitudes be calculated from the torque-time function for the point. For the torque-time function, therefore, all the local maximum values $\tau_{max}$ and minimum values $\tau_{min}$ are therefore detected simultaneously and from these maximum and minimum values the amplitude of the torque changes is then calculated $$\tau_{ij} = \frac{\tau_{max} - \tau_{min}}{2} \tag{2}$$

Algorithms for detecting and calculating relevant torque variations may be carried out in many different known ways. For example, extreme-value search or calculation of the number of torque maximums which exceed and the number of torque minimums which fall below given torque levels may be made directly from the torque-time function. An alternative to using special algorithms in the time plane is to use frequency analysis, for example with an FFT algorithm.

The load spectrum is updated during one observation cycle $\Delta t$. The observation period should be at least one robot cycle, that is, the time it takes for the robot to carry out the robot program in question. It is suitable to choose the observation period such that variations in the use of the robot during the day are included. In this embodiment, the observation period is 24 hours.

For calculating the maximum permissible load, a so-called utilization factor for the point i is first calculated. In this embodiment, partial damage $D_i$ is used for calculating the utilization factor.

$$D_i = \sum_{j=1}^{l} \frac{n_{ij}}{N_{ij}} \tag{3}$$

$N_{ij}$ is the maximum number of permissible load cycles in an interval $[\tau_{j-1} - \tau_j]$, and $n_{ij}$ is the number of torque changes with amplitudes within the interval $[\tau_{j-1} - \tau_j]$. The number of torque changes $\Delta n_{ij}$ with amplitudes within given torque intervals $[\tau_{j-1} - \tau_j]$, measured within one observation period, are stored in a table for the load spectrum of each critical point. For each torque interval, the number of load cycles $\Delta n_{ij}$ are calculated, block 11. The table is updated during each observation period. The following is an example of such a table for a critical point i:

| $[\tau_{j-1} - \tau_j]$ | $\Delta n_{ij}$ |
|---|---|
| $0 - \tau_1$ | $\Delta n_{i1}$ |
| $\tau_1 - \tau_2$ | $\Delta n_{i2}$ |
| $\tau_2 - \tau_3$ | $\Delta n_{i3}$ |

-continued

| $[\tau_{j-1} - \tau_j]$ | $\Delta n_{ij}$ |
|---|---|
| . | . |
| . | . |
| $\tau_{l-1} - \tau_l$ | $\Delta n_{il}$ |

The table serves as a basis for calculating the rate of change of the partial damage, block 12:

$$\frac{\Delta D_i}{\Delta t} = \frac{1}{\Delta t}\left[\sum_{j=1}^{l}\frac{n_{ij} + \Delta n_{ij}}{N_{ij}} - \sum_{j=1}^{l}\frac{\Delta n_{ij}}{N_{ij}}\right] = \frac{1}{\Delta t}\sum_{j=1}^{l}\frac{\Delta n_{ij}}{N_{ij}} \quad (4)$$

If the partial damage is accumulated during the whole service life of the robot, the sum of all the partial damage is 1. The maximum permissible partial damage $D_{imax}$ during the service life of the robot should have a value which is immediately below 1, for example it may be chosen to be $D_{imax}=0.9$. $\Delta D_i$ constitutes the increase of the partial damage during the period $\Delta t$. The increase in partial damage per unit of time, $\Delta D_i/\Delta t$, constitutes a measure of the rate at which the structure approaches fatigue per unit of time. If the service life $t_{life}$ of the robot is known, the increase in partial damage per unit of time may be used for calculating the maximum permissible load. In this embodiment, the service life $t_{life}$ of the robot is predetermined by the robot manufacturer. From the following relationship, the largest increase in partial damage per unit of time $$\left(\frac{\Delta D_i}{\Delta t}\right)_{max}$$

is calculated which may be allowed for the structure at the critical point to last during the predetermined service life:

$$\left(\frac{\Delta D_i}{\Delta t}\right)_{max} = \frac{D_{imax}}{t_{life}} \quad (5)$$

From this the utilization factor $k_{ilife}$ for the point i may be calculated, block 13:

$$k_{life} = \frac{\frac{\Delta D_i}{\Delta t}}{\frac{D_{imax}}{t_{life}}} \quad (6)$$

The utilization factor is calculated for each one of the critical points. The utilization factor $k_{life}$ of the robot is the utilization factor for the critical point which has the greatest $k_{ilife}$.

$$k_{life}=\text{Max}\{k_{ilife}\} \quad (7)$$

If $k_{life}<1$, the performance, i.e. axis speeds and axis torques, may be increased.

If $k_{life}>1$, the performance must be reduced.

Calculating, based on $k_{life}$, maximum values of axis speeds $\phi_{max}$ and axis torques $\tau_{axis,max}$ such that the bending moments $\tau_i$ achieve values such that $k_{life}=1$ is a very difficult mathematical problem. Instead, an adaptive method may be used. Since it is a question of very long periods of time for the fatigue process, the problem is most suitable for adaptivity. The adaptivity means that $\phi_{max}$ and $\tau_{axis,max}$ are reduced, are maintained constant, or are increased in dependence on whether $k_{life}>1$, $k_{life}=1$ or $k_{life}<1$. The maximum axis speeds $\phi_{max}$ and axis torques $\tau_{axis,max}$ are now adjusted by the control system after each observation period such that, after a number of observation periods, the robot is run with $k_{life}=1$, block 14.

The relation between the changes of the maximum axis speeds $\phi_{max}$ and axis torques $\tau_{axis,max}$ is determined by what terms in equation 1 give the greatest contribution when calculating the bending moment $\tau$ for the limiting point. If $M_i(\phi) \cdot \ddot{\phi} + G_i(\phi)$ is predominant, the greatest change is made in $\tau_{axis,max}$ and if $V_i(\phi) \cdot (\dot{\phi})^2$ is predominant, $\dot{\phi}_{max}$ is most controlled.

A disadvantage with the embodiment described above is that the service life of the robot must be determined on installation of the robot. It is not possible to change the service life after a few years to obtain higher performance from the robot or for extending the use of the robot. In a second embodiment of the invention, the maximum permissible load is adapted to the entire prehistory of the robot.

Figure 4:
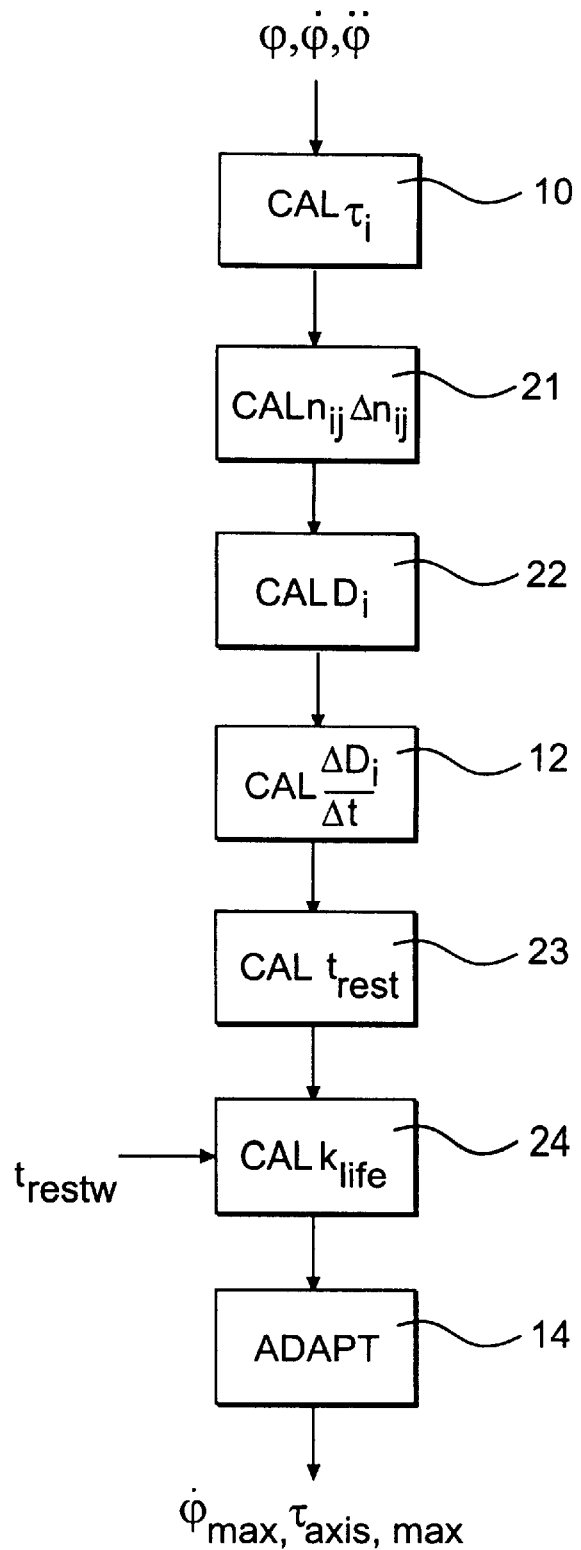
FIG. 4 shows a flow diagram for a second embodiment according to the invention.

FIG. 4 shows a flow diagram of a second embodiment of the invention. The relevant load $\tau$ at the critical points is calculated according to equation 1 in the same way as in the first embodiment, block 10. In block 21 $\Delta n_{ij}$ is calculated in the same way as in the preceding examples. One difference is that, in this embodiment, the number of torque changes are calculated and stored in different torque intervals $$n_{ij} = \sum_{t=0}^{t_{age}} \Delta n_{ij}$$

from the time the robot was new and up to the present age $t_{age}$ of the robot:

| $[\tau_{j-1} - \tau_j]$ | $n_{ij}$ | $\Delta n_{ij}$ |
|---|---|---|
| $0 - \tau_1$ | $n_{i1}$ | $\Delta n_{i1}$ |
| $\tau_1 - \tau_2$ | $n_{i2}$ | $\Delta n_{i2}$ |
| $\tau_2 - \tau_3$ | $n_{i3}$ | $\Delta n_{i3}$ |
| $\tau_{l-1} - \tau_l$ | $n_{il}$ | $\Delta n_{il}$ |

Since $n_{ij}$ is now stored since the robot was new, the partial damage $D_i$ may be calculated according to equation 3, block 22. In the same way as before, the relevant partial damage increase per unit of time, $\Delta D_i/\Delta t$, is calculated, block 12. The remaining service life $t_{irest}$ is calculated from the following relationship:

$$t_{irest} = \frac{D_{imax} - D_i}{\frac{\Delta D_i}{\Delta t}} \quad (8)$$

The point which has the shortest remaining service life determines the remaining service life $t_{rest}$ of the robot, block 23.

$$t_{rest}=\text{Min}(t_{rest}) \quad (9)$$

If the present age $t_{age}$ of the robot is continuously updated and stored in the control system, the total service life $t_{life}$ of the robot may be calculated according to $t_{life}=t_{age}+t_{rest}$. The total service life $t_{life}$ and the remaining service life $t_{rest}$ of the robot can be presented to the robot operator, who may then choose to reduce the performance and hence increase the remaining service life, or increase the performance at the expense of a reduced remaining service life. Changing the performance means that the levels for the maximum permissible axis speeds and axis torques are changed.

Instead of the operator controlling the performance level, the control system may automatically adjust the performance such that a desired service life $t_{life}$ or a desired remaining service life $t_{restw}$, entered by the operator, is obtained. In block 24 the utilization factor $k_{life}$ is calculated according to:

$$k_{life} = \frac{t_{restw}}{t_{rest}} = \frac{t_{life} - t_{age}}{t_{rtest}} \quad (10)$$

Maximum values for axis speeds and axis torques may be adjusted according to the adaptive method described above, block 14.

In order to make possible a fully automated service life optimization, it is required that the accumulated number of load cycles $n_{ij}$ and the age $t_{age}$ of the robot are always available. One problem is if a control cabinet is replaced without the robot accompanying the control cabinet. Then, the load spectrum and the age of the robot must be saved in order to be read later on into the new control system. This problem may be solved by mounting a memory module in the foot of the robot and which can then be written and read by the control system.

As an alternative to partial damage $D_i$ a constant equivalent amplitude $S_{eqai}$ may be used to calculate the remaining service life:

$$S_{eqai} = \left( \sum_j \frac{n_{ij}}{N_{jo}} \cdot Sa_{ij}^{|k_j|} \right)^{\frac{1}{|k_j|}} \quad (11)$$

$N_{jo}$ is the number of torque changes corresponding to the service life at a maximum permissible equivalent load $S_{eqaimax}$:

$$\frac{\Delta S_{eqai}}{\Delta t} = \left( \left( \sum_j \frac{n_{ij}(t+\Delta t)}{N_{jo}} \cdot Sa_{ij}^{|k_j|} \right)^{\frac{1}{|k_j|}} - \left( \sum_j \frac{n_{ij}(t)}{N_{jo}} \cdot Sa_{ij}^{|k_j|} \right)^{\frac{1}{|k_j|}} \right) / \Delta t \quad (12)$$

$S_{aij}$ is the mean torque in the torque interval $[Y_{j-1} - \tau_j]$ and $k_i$ is the inclination in the fatigue curve. The remaining service life for a critical point i is calculated:

$$t_{resti} = \frac{S_{eqaimax} - S_{eqai}}{\frac{\Delta S_{equa}}{\Delta t}} \quad (13)$$

The critical point which has the shortest remaining service life limits the whole of the remaining age of the robot. The remaining service life of the robot is:

$$T_{rest} = \text{Min}\{t_{resti}\}. \quad (14)$$

What is claimed is:

1. A method for control of an industrial robot, which has a plurality of movement axes with a position sensor for each of said axes for supplying an output signal defining a current position of the axis to a control system for control of the axes of the robot, wherein continuously during operation of the robot, the following steps are taken for at least one mechanically critical point (i) of the robot:

calculating a relevant load ($\tau_i$) during a predetermined period of time ($\Delta t$) on the basis of a position ($\phi_1$, $\phi_2 \ldots \phi_6$) of the robot and a mathematical model of the robot, calculating a rate of fatigue $$\frac{(\Delta Di)}{(\Delta t)}$$

of the point on the basis of the calculated load and with knowledge of a fatigue strength ($N_{ij}$) of material at the critical point, and adjusting a performance ($\phi_{axis,max}$, $\tau_{axis,max}$) of the robot in dependence on the rate of fatigue and a desired service life ($t_{life}$) of the robot.

2. A method according to claim 1, wherein the rate of fatigue $$\left( \frac{\Delta D_i}{\Delta t} \right)$$

is calculated starting from a number of load cycles ($\Delta n_{ij}$) within a load interval ($\tau_{j-1} - \tau_j$) during said period ($\Delta t$).

3. A method according to claim 2, wherein utilization factor ($k_{life}$) is calculated in dependence on the calculated rate of fatigue $$\left( \frac{\Delta D_i}{\Delta t} \right)$$

and a maximum permissible rate of fatigue $$\left( \frac{\Delta D_i}{\Delta t} \right)_{max}$$

for the desired service life ($t_{life}$) of the robot.

4. A method according to claim 3, wherein the maximum permissible rate of fatigue $$\left( \left( \frac{\Delta D_i}{\Delta t} \right)_{max} \right)$$

is calculated as a quotient between the maximum permissible fatigue ($D_{imax}$) and the desired service life ($t_{life}$) of the robot.

5. A method according to claim 3, wherein the utilization factor ($k_{life}$) is calculated for a plurality of critical points and that the performance ($\phi_{max}$, $\tau_{axis,max}$) of the robot is adjusted in dependence on a point which has the highest utilization.

6. A method according to claim 1, wherein the desired service life ($t_{life}$) of the robot is determined when the robot is new.

7. A method according to claim 2, wherein the number of load cycles ($\Delta n_{ij}$) within the load interval ($\tau_{j-1} - \tau_j$) are accumulated during the whole service life of the robot and that a relevant fatigue ($D_i$) is calculated in dependence on the accumulated load.

8. A method according to claim 7, wherein a remaining service life ($t_{resti}$) of the robot is calculated in dependence on the rate of fatigue $$\left( \frac{\Delta D_i}{\Delta t} \right)$$

and the difference between a maximum permissible fatigue ($D_{imax}$) and the relevant fatigue ($D_i$).

9. A method according to claim 8, wherein the remaining service life ($t_{resti}$) of the robot is calculated for a plurality of critical points and that a shortest remaining service life determines the remaining service life ($t_{rest}$) of the robot.

10. A method according to claim 1, wherein the performance ($\dot{\phi}_{axis,max}$, $\tau_{axis,max}$) of the robot is adjusted in dependence on an optional desired service life ($t_{life}$).

11. A method according to claim 10, wherein a utilization factor ($k_{life}$) is calculated in dependence on the optional service life ($t_{life}$) and a calculated remaining service life ($t_{rest}$) and that the performance ($\dot{\phi}_{max}$, $\tau_{axis,max}$) of the robot is adjusted in dependence on the utilization factor.

12. A method according to claim 3, wherein, in dependence on whether the utilization factor ($k_{life}$) is greater or smaller than a given value, the performance of the robot is increased or reduced.

13. A method according claim 1, wherein the performance of the robot is changed by changing maximum rotational speeds ($\dot{\phi}_{max}$) and maximum torques ($\tau_{axis,max}$) of the robot.

14. A method according to claim 13, wherein the relation between the adjustments of the maximum rotational speeds ($\dot{\phi}_{max}$) and the maximum torques ($\tau_{axis,max}$) of the robot is determined in dependence on the relation between the effect of an acceleration, ($M_i(\phi) \cdot \ddot{\phi}$), a gravitation ($G_i(\phi)$) and a centrifugal force ($V_i(\phi) \cdot (\dot{\phi})^2$) on the relevant load ($\tau_i$).

* * * * *